United States Patent
Hoesle (10) Patent No.: US 12,323,009 B2
(45) Date of Patent: Jun. 3, 2025

(54) DRIVE SHAFT OF A DYNAMOELECTRICAL MACHINE AND CORRESPONDING MANUFACTURING METHOD

(71) Applicant: Innomotics GmbH, Nuremberg (DE)

(72) Inventor: Markus Hoesle, Erlangen (DE)

(73) Assignee: Innomotics GmbH, Nuremberg (DE)

( * ) Notice: Subject to any disclaimer, the term of this patent is extended or adjusted under 35 U.S.C. 154(b) by 284 days.

(21) Appl. No.: 17/764,875

(22) PCT Filed: Sep. 22, 2020

(86) PCT No.: PCT/EP2020/076397
§ 371 (c)(1),
(2) Date: Mar. 29, 2022

(87) PCT Pub. No.: WO2021/063745
PCT Pub. Date: Apr. 8, 2021

(65) Prior Publication Data
US 2022/0344990 A1 Oct. 27, 2022

(30) Foreign Application Priority Data
Sep. 30, 2019 (EP) .................................. 19200500

(51) Int. Cl.
*H02K 1/32* (2006.01)
*H02K 7/00* (2006.01)
*H02K 9/22* (2006.01)

(52) U.S. Cl.
CPC ............. *H02K 1/32* (2013.01); *H02K 7/003* (2013.01); *H02K 9/22* (2013.01)

(58) Field of Classification Search
CPC ............ H02K 1/32; H02K 7/003; H02K 9/22; H02K 9/223; H02K 9/06; H02K 2209/00
USPC ........................................................ 310/61
See application file for complete search history.

(56) References Cited

U.S. PATENT DOCUMENTS

| | | |
|---|---|---|
| 2008/0309174 A1 | 12/2008 | Jockel |
| 2011/0241040 A1 | 10/2011 | Yu et al. |
| 2013/0055902 A1 | 3/2013 | Berto et al. |
| 2014/0333161 A1 | 11/2014 | Knoblauch |
| 2015/0022041 A1 | 1/2015 | Eccles et al. |
| 2015/0335070 A1 | 11/2015 | Sears et al. |
| 2016/0028283 A1 | 1/2016 | Chankaya et al. |
| 2016/0241113 A1* | 8/2016 | Suzuki ............ H02K 1/32 |

(Continued)

FOREIGN PATENT DOCUMENTS

| | | |
|---|---|---|
| CN | 101325352 A | 12/2008 |
| CN | 102905590 A | 1/2013 |

(Continued)

OTHER PUBLICATIONS

Machine translation of CN-104776110-A. (Year: 2015).*

(Continued)

*Primary Examiner* — Michael Andrews
(74) *Attorney, Agent, or Firm* — Henry M. Feiereisen LLC (57) ABSTRACT

A drive shaft of a dynamoelectric machine includes at least two different heat conduction paths that are thermally separate from one another. Each of the at least two heat conduction paths has two physically separate ends and is embodied such that heat is able to couple into the drive shaft at a first one of the two ends and to couple out of the drive shaft at a second one of the two ends.

21 Claims, 4 Drawing Sheets

(56) References Cited

U.S. PATENT DOCUMENTS

| | | |
|---|---|---|
| 2016/0352201 A1 | 12/2016 | Ranjan et al. |
| 2017/0237316 A1* | 8/2017 | Filgertshofer ......... H02K 7/083 310/52 |
| 2018/0233977 A1 | 8/2018 | Volkmuth et al. |
| 2019/0234313 A1 | 8/2019 | Kray et al. |

FOREIGN PATENT DOCUMENTS

| | | |
|---|---|---|
| CN | 104776110 A * | 7/2015 |
| CN | 206992887 U | 2/2018 |
| CN | 110098691 A | 8/2019 |
| DE | 42 30 379 A1 | 3/1994 |
| DE | 199 00 559 C1 | 9/2000 |
| DE | 102004053424 B4 | 9/2006 |
| DE | 10 2006 045 178 A1 | 4/2008 |
| DE | 102009019154 A1 | 2/2011 |
| DE | 102014202055 A1 | 8/2015 |
| DE | 102016202416 A1 | 8/2017 |
| DE | 10 2016 124 632 A1 | 6/2018 |
| DE | 102017112835 A1 | 12/2018 |
| EP | 3131189 A1 | 2/2017 |
| FR | 3 065 124 A1 | 10/2018 |
| GB | 25 68 368 A | 7/2018 |
| JP | S5577350 A | 8/1980 |
| JP | H06141509 A | 5/1994 |
| JP | H06178501 A | 6/1994 |
| JP | 2002-017066 A | 1/2002 |
| JP | 2007010018 A | 1/2007 |
| JP | 2014135859 A | 7/2014 |
| JP | 2014-220996 A | 11/2014 |
| JP | 2016-149898 A | 8/2016 |
| KR | 101957819 81 | 3/2019 |
| TW | 201135884 A | 10/2011 |
| WO | WO 2017013144 A1 | 1/2017 |
| WO | WO 2017-050447 A1 | 3/2017 |
| WO | WO 2017-104560 A1 | 6/2017 |
| WO | WO 2017207212 A1 | 12/2017 |
| WO | WO 2017211477 A1 | 12/2017 |
| WO | WO-2018059844 A1 * | 4/2018 |
| WO | WO 2018153637 A1 | 8/2018 |

OTHER PUBLICATIONS

Machine translation of WO-2018059844-A1. (Year: 2018).*
PCT International Search Report and Written Opinion of International Searching Authority mailed Nov. 2, 2020 corresponding to PCT International Application No. PCT/EP2020/076397 filed Sep. 22, 2020.

* cited by examiner

DRIVE SHAFT OF A DYNAMOELECTRICAL MACHINE AND CORRESPONDING MANUFACTURING METHOD

CROSS-REFERENCES TO RELATED APPLICATIONS

This application is the U.S. National Stage of International Application No. PCT/EP2020/06397, filed Sep. 22, 2020, which designated the United States and has been published as International Publication No. WO 2021/063745 A1 and which claims the priority of European Patent Application, Serial No. 19200500.7, filed Sep. 30, 2019, pursuant to 35 U.S.C. 119(a)-(d).

The invention relates to a drive shaft of a dynamoelectric machine.

Moreover, the invention relates to a dynamoelectric machine with at least one such drive shaft.

The Invention also relates to a driven machine with at least one dynamoelectric machine of the aforementioned type.

In addition, the invention relates to a method for manufacturing a drive shaft of the aforementioned type.

Furthermore, the invention relates to a computer program comprising a digitized image, wherein the digitized image is configured to simulate the aforementioned drive shaft or the aforementioned dynamoelectric machine.

The invention also relates to a digital twin of the aforementioned dynamoelectric machine or the aforementioned driven machine.

Moreover, the invention relates to a digital twin comprising a digitized image of the aforementioned drive shaft.

Drive shafts of driven machines, such as fans, compressors, cranes, spindles are generally driven by dynamoelectric machines. These shafts are often non-rotatably connected to a rotor of the dynamoelectric machine and mounted in one or more bearings. Due to the mechanical strength required, these shafts are forged, turned or cast from materials. These materials also transport heat comparatively well. However, in this case, heat from different heat sources is coupled to the drive shafts. Hence, for example, a bearing inner ring can be in thermal contact with the rotor's laminated core. Likewise, components of the driven machine can be in thermal contact with components of the dynamoelectric machine, such as, for example, bearings or the rotor. This means, for example, that heat "flows" from a heat source with a higher temperature to a heat source with a lower temperature. This can, for example, lead to heating of the bearings and thus possibly to impairment of the lubricating properties.

Moreover, bearing currents which damage the raceways of the bearings, in particular roller bearings, can also occur with a drive arrangement of this kind.

One possible approach for countering the aforementioned problem and, for example, avoiding impairment of the lubricating properties is to use lubricant that is more temperature-resistant in the bearings. However, this may be undesirable for reasons of maintenance, heat dissipation and cost.

SUMMARY OF THE INVENTION

The object of the present invention is to provide a drive shaft with improved heat transfer properties that is easier to maintain and less expensive to manufacture.

The object is achieved according to the invention with a drive shaft of the aforementioned type in that the drive shaft comprises at least two different heat conduction paths that are thermally separate from one another, wherein each heat conduction path has two physically separate ends and is embodied such that heat can couple into the drive shaft at one of the two ends and can couple out of the drive shaft at the other end. The heat conduction paths are preferably embodied as different.

In other words, the drive shaft comprises at least two thermally insulating layers, which define at least two heat conduction paths and thermally separate these at least two heat conduction paths from one another.

A shaft structure of this kind also enables bearing currents to be avoided.

Hence, the invention is based on the knowledge that heat from heat sources with different temperature levels can be conducted to a heat sink along different heat conduction paths that are insulated from one another.

In the context of the present invention, the term "heat source" should also be understood to mean a plurality of heat sources with similar temperature levels. Heat from such heat sources can be conducted to the heat sink via the same heat conduction path.

In one embodiment, it can advantageously be provided that a first end of each heat conduction path can be thermally coupled to a heat source and a second end of this heat conduction path can be thermally coupled to a heat sink, wherein the different heat sources can be thermally coupled to the different heat conduction paths and the heat sources have a higher temperature than the heat sink.

The term heat source can also comprise a plurality of different heat sources if these heat sources have approximately the same temperature level.

It can also advantageously be provided that the different heat conduction paths that are thermally separate from one another are made of different materials. In this case, the materials used include a wide variety of steels, metals, alloys and plastics depending on the thermal and mechanical requirements of the drive shaft It can moreover be provided that the heat conduction paths can be thermally separated from one another by a corresponding layer or layers, wherein each layer comprises a material, preferably consists of this material, with thermal conductivity that is worse than the thermal conductivity of the heat conduction paths.

With heat conduction paths that at least partially adjoin an outer peripheral surface of the drive shaft, it can also be expedient for these heat conduction paths to be thermally separate from the outer peripheral surface of the drive shaft, for example by the provision of at least one further thermally insulating layer. In this case, this at least one layer can comprise a material, preferably consist of this material, with thermal conductivity that is worse than the thermal conductivity of the medium surrounding the drive shaft, for example air.

It can be expedient for at least one of the heat conduction paths, preferably each heat conduction path, to form a monolithic structure.

Further advantages arise if the different heat conduction paths are electrically separate from one another.

In a particularly preferred embodiment, it can advantageously be provided that the heat conduction paths are arranged coaxially.

Furthermore, it can advantageously be provided that, in cross section, each heat conduction path has approximately the shape of a segment of a circle, a segment of a ring, or a segment of an annulus.

It can further advantageously be provided that the drive shaft has a receptacle, which is configured to receive at least one heat sink and is preferably arranged coaxially with the drive shaft.

In order not to be exposed to any heat flow from the driven machine, it may be expedient for the drive shaft to have a thermal block, which prevents heat flow in the axial direction between a first part, for example a first axial section of the drive shaft, and a second part, for example a second axial section of the drive shaft.

The object is also achieved with a dynamoelectric machine with at least one drive shaft as described above.

In a preferred embodiment, the machine can comprise at least two heat sources each with a different temperature and at least one heat sink, wherein the different heat sources are thermally coupled to the different heat conduction paths that are thermally separate from one another in such a way that heat from the different heat sources is able to flow along the different heat conduction paths to the at least one heat sink in an insulated manner.

Preferably, each heat source is thermally coupled to a heat conduction path and vice versa, so that there is one-to-one correspondence between the heat sources and heat conduction paths.

It can moreover be provided that at least one of the heat sources is embodied as a rotor section, which is preferably fixed non-rotatably on the drive shaft, or as a bearing, in which the drive shaft is preferably mounted and, in particular, mechanically connected thereto.

It can also be provided that the heat sink is embodied as a fan or a heat exchanger.

It can be expedient for no further heat couplings to be provided on the heat sink.

Moreover, it can be expedient for the fan to be thermally coupled to the drive shaft.

Further advantages arise if the heat sink comprises a cooling medium, for example air, so that heat is dissipated to this cooling medium. Then, a thermal coupling can only be established via the cooling medium.

It can be expedient for the machine to further comprise a heat-separating apparatus, wherein the heat-separating apparatus is embodied and arranged on the drive shaft in such a way, that, after decoupling from the different heat conduction paths, heat can continue to flow away from the machine along paths that are thermally insulated from one another.

It can be provided that the heat sink comprises the aforementioned heat-separating apparatus. This enables the separation of heat to continue in the heat sink, for example in the fan or in the heat exchanger.

The object is also achieved with a method for manufacturing the above-described drive shaft for the above-described dynamoelectric machine, wherein the method comprises the following steps:

computer-aided design of a three-dimensional model of the aforementioned drive shaft based on a distribution of heat sources and preferably sink(s) in the dynamoelectric machine along the drive shaft;

manufacturing the drive shaft according to the three-dimensional model design by means of an additive manufacturing method or a 3D printing method.

In this case, it can be provided that the manufacture of the drive shaft using the additive manufacturing method or a 3D printing method takes place either along or transversely to the axial direction of the drive shaft. This means that layers can be applied along or transversely to the axial direction of the drive shaft.

It is noted at this point that the formation of the heat conduction paths, their thermal separation, such as, for example, the formation of the corresponding layers, or the block can take place by means of the additive manufacturing method or the 3D printing method.

Hence, the invention is also based on the knowledge that a drive shaft can be designed by means of an additive manufacturing method or a 3D printing method from different layers/materials in such a way that almost every heat source within the drive shaft has its own "thermal path"—heat conduction path—to the heat sink. In this case, the starting point for the manufacture of a shaft of this kind, is knowledge of the distribution of the heat sources along the drive shaft. In other words, each heat source is assigned its own docking point on the shaft, wherein all of the docking points are distributed axially and/or radially and/or in the circumferential direction.

All in all, an additive manufacturing method or 3D printing method can be used to manufacture a drive shaft that not only serves to transmit torque to a driven machine, but also ensures balanced and efficient heat management, for example of a dynamoelectric machine and the driven machine thereof, in that heat sources that are thermally coupled to the shaft can be cooled independently of one another.

BRIEF DESCRIPTION OF THE DRAWING

The invention together with further advantages is explained in more detail below with reference to exemplary embodiments, which are illustrated in the drawing, in which.

DETAILED DESCRIPTION OF PREFERRED EMBODIMENTS

In the following, unless indicated otherwise, the same reference characters denote the same features.

Figure 1:
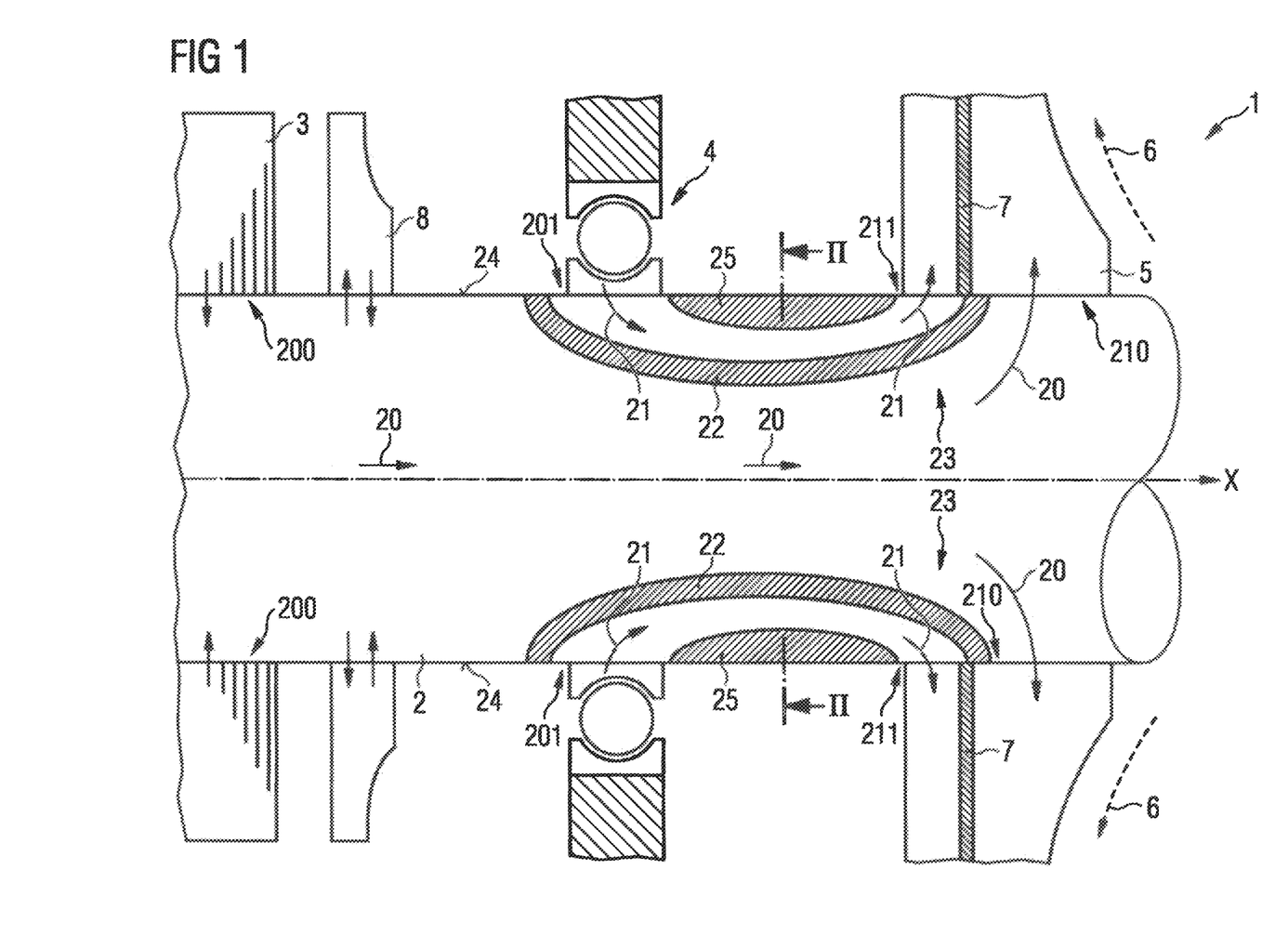
FIG. 1 shows a dynamoelectric machine with a drive shaft.

First of all, reference is made to FIG. 1. FIG. 1 shows a detailed representation of a dynamoelectric machine 1 with a drive shaft 2 corresponding to the drive shaft according to the invention. A rotor section 3 is fixed non-rotatably on the drive shaft 2. Furthermore, FIG. 1 shows a bearing 4 of the drive shaft 2. The drive shaft 2 can be mounted in the bearing 4 and be mechanically connected thereto.

The rotor and the bearing are examples of heat sources whose heat is coupled to the drive shaft 2. In order to dissipate this heat more efficiently, the drive shaft 2 has two different heat conduction paths 20, 21 that are thermally separate from one another, which, for example, extend along an axial direction X of the drive shaft 2. A direction in which heat is dissipated in the example shown, is illustrated with arrows (heat flow direction). This direction can be parallel to the axial direction X of the drive shaft 2. The heat conduction paths 20, 21 can be made of the same materials or different materials. The heat conduction paths 20, 21 can, for example, be thermally separated by a layer 22 of a material with thermal conductivity that is worse than the thermal conductivity of the two heat conduction paths 20, 21. Preferably, each heat conduction path 20, 21 is monolithic.

Each path 20 or 21 has two ends 200, 210 or 201, 211. It is expedient for the ends of the respective heat conduction path to be physically separate from one another (see FIG. 1). Heat can be coupled into one end 200, 201 of the corresponding heat conduction paths 20, 21 and out of the other end 210, 211. It may be identified from the figure that the rotor section 3 is thermally coupled to a first end 200 of a first heat conduction path 20 and the bearing 4 to be thermally coupled to a first end 201 of a second heat conduction path 21. Due to thermal separation, heat from different heat sources 3, 4 flows (see arrow directions) along the different paths 20, 21 and in each case is coupled out of the drive shaft 2 from a second end 210, 211 of the corresponding heat conduction path 20, 21.

The second ends of the different heat conduction paths are thermally coupled to a heat sink. The heat sink can, for example, be a fan 5 in thermal contact with the drive shaft 2 or a heat exchanger (not shown) or a cooling medium, for example air. An exemplary direction of flow 6 of cooling air can also be seen in FIG. 1. The fan 5 draws heat from the drive shaft 2 and dissipates it to the cooling medium.

The machine 1 can also be provided with a heat-separating apparatus 7. This separating apparatus is embodied such and in contact with the drive shaft 2 such that heat from the second end of one heat conduction path (for example the heat conduction path 21) cannot couple back into the second end of the other heat conduction path (for example the heat conduction path 20). This can enable thermal separation outside the drive shaft 2 in order to keep the thermal coupling low there as well, thus reducing heat flow "back" to the respective heat source (for example rotor section 3 or bearing 4).

In addition, so-called "thermal return paths" can be avoided as far as possible while at the same time efficiency of the heat dissipation is improved. The heat-separating apparatus 6 can, for example, be a partition wall made of a non-thermally conductive material or at least of a material with thermal conductivity that is worse than the thermal conductivity of air. For example, it is possible to use the same material as that used for the layer 22.

The aforementioned fan 5, for example an integral fan, can be fixed to the shaft end 23 of the drive shaft 2 arranged downstream of the heat-emitting heat sources—here the rotor section 3 and the bearing 4—in the axial direction X. The shaft end 23 is preferably in thermal contact with a heat sink, such as, for example, cooling medium 6, fan 5 or heat exchanger (not shown). This enables convection in the dynamoelectric machine to be further improved. It may be identified from FIG. 1 that the fan 7 can be thermally coupled to or in thermally conductive contact with the second ends 210, 211 of both heat conduction paths 20, 21. Moreover, it may be identified from FIG. 1 that the aforementioned heat-separating apparatus 7 can be part of the fan 5. It is quite conceivable for different fans to be in thermally conductive contact with the second ends of different heat conduction paths—this enables different heat conduction paths to have different heat sinks.

In addition, it is also possible for an auxiliary thermal element 8 to be provided within the dynamoelectric machine 1 (for example a further fan) which either dissipates heat to the interior of the dynamoelectric machine 1 or absorbs heat from there and supplies it to the fan 5 via one of the heat paths—here via the first heat conduction path 20. It is emphasized at this point that it is also possible for a plurality of different heat sources with similar temperature levels to be coupled to each heat conduction path. In the above-described exemplary embodiment, these heat sources are: the rotor section 3 and the auxiliary thermal element 8.

Figure 2:
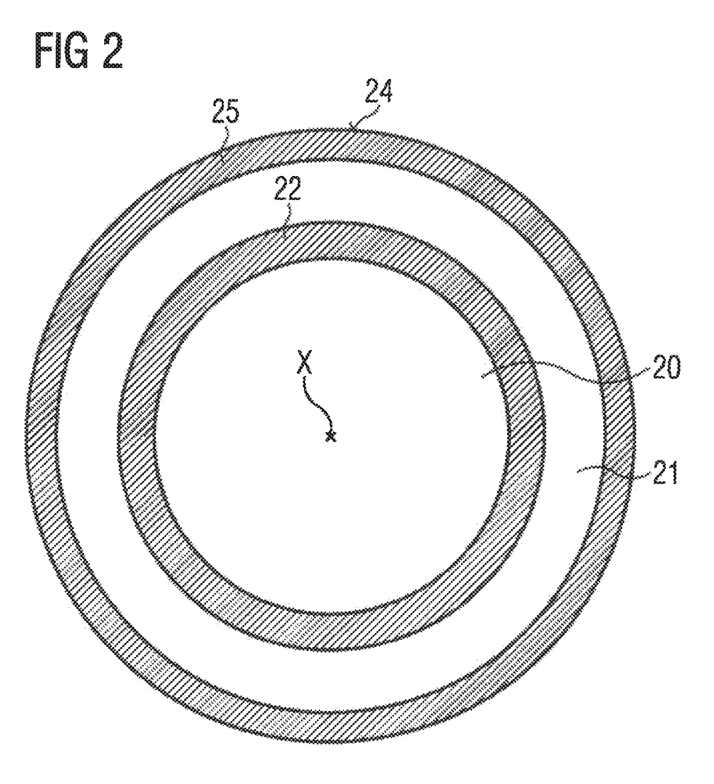
FIG. 2 shows a cross section of the drive shaft in FIG. 1.

FIG. 2 shows a sectional view of FIG. 1. The drive shaft 2 can, for example, be provided as a solid shaft. It may be identified from a joint examination of FIG. 1 and FIG. 2 that the heat conduction paths 20, 21 can be arranged coaxially. In this case, the second heat conduction path 21 can be circular in the radial direction and U-shaped in the axial direction. With the exception of its two ends 201, 211, the second heat conduction path 21 can be thermally separated from an outer peripheral surface 24 of the drive shaft 2 by a further layer 25 made of a material with thermal conductivity that is at least worse than the thermal conductivity of air. This can further improve heat transfer through the second path 21. The first heat conduction path 20 can remain partially non-thermally insulated: FIG. 1 shows that no thermally insulating layer is provided between the greater part of the first heat conduction path 20 and the outer peripheral surface 24 of the drive shaft 2. However, such a layer is of course conceivable and can be used to improve convection properties of the first heat conduction path 20.

It can be identified from FIG. 2 that the thermally insulating layer 22 and the further thermally insulating layer 25 define an intermediate space in the drive shaft 2 that forms the heat conduction path 21. The other heat conduction path 20 is formed by a space defined between the thermally insulating layer 22 and the outer peripheral surface 24 of the drive shaft 2.

It may in particular be identified from FIG. 2 that the heat conduction paths 20, 21 can be (intrinsically) closed in the circumferential direction of the drive shaft 2. This makes it possible to dissipate heat from a heat source, for example from a bearing 4, at any angle of rotation of the drive shaft 2. In other words, while the drive shaft 2 rotates, the heat conduction paths 20, 21 can continuously dissipate heat from the heat sources due to their closed shape. This can increase the efficiency of heat dissipation.

Figure 3:
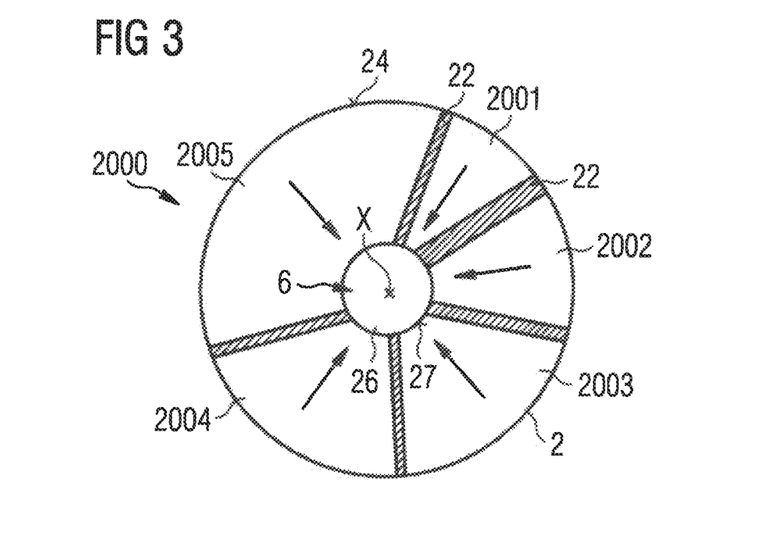
FIG. 3 shows a cross section of a drive shaft according to a further preferred embodiment.

FIG. 3 shows a section of a drive shaft 2000 transverse to its axial direction X according to a further preferred embodiment. FIG. 3 shows that the aforementioned heat conduction paths 20, 21 can have a different geometric shape. Depending on the heat source, the thermally conductive paths 2001, 2002, 2003, 2004, 2005 of the shaft 2000 can also have a segment-like structure when viewed in the circumferential direction. This depends on the respective thermal coupling of the respective heat source to the drive shaft 2000.

It may be identified from FIG. 3 that, in cross section, the heat conduction paths 2001 to 2005 can be embodied as segments of a ring, in particular segments of an annulus of the hollow shaft with a ring-shaped, in particular annulus-shaped hollow shaft 2000. In this case, heat and heat sources which can rotate with the drive shaft 2000, for example are firmly connectable to the drive shaft 2000, can be dissipated more efficiently. The heat conduction paths 2001 to 2005 can be formed by intermediate spaces defined between the thermally insulating layers 22. Each Insulating layer 22 can extend from an outer peripheral surface 24 of the drive shaft 2000 to an inner peripheral surface 27 of the drive shaft 2000.

Moreover, it may be identified from FIG. 3 that the drive shaft 2000 can have a receptacle 26 or a cavity in its interior. This receptacle 26, which is, for example, arranged coaxially with the drive shaft 2000, preferably serves as a heat sink or as heat sinks. In particular, a coolant 6, for example air, can flow through the receptacle and enable heat to be transferred along the respective heat conduction paths 2001 to 2005 from the outer peripheral surface 24 to the inner peripheral surface 27 of the hollow shaft 2000. Obviously, this embodiment can also be provided with technical features that have already been described, for example to avoid "thermal short circuits" or to improve the convection properties without the need for separate adaptation of other features.

Figure 4:
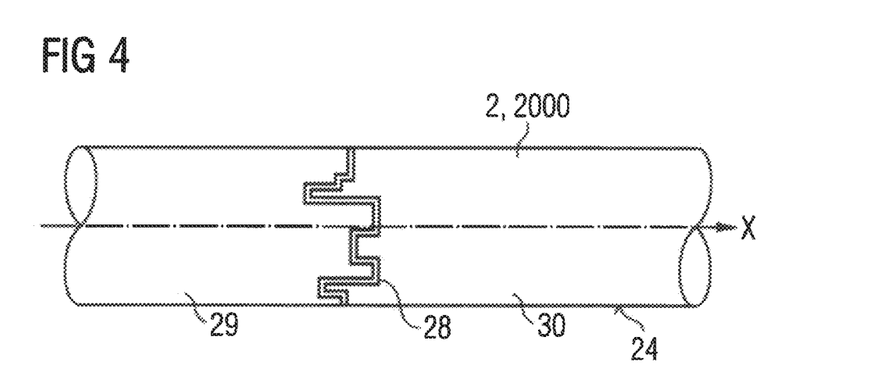
FIG. 4 shows a drive shaft with a block.

In order not to be exposed to any heat flow from a driven machine (not shown), the shaft 2, 2000 can be additionally equipped with a thermal and/or electric block 28 (FIG. 4). This block 28 can, for example, take the form of a mechanical coupling and be configured to connect a first part 29 with a second part 30 of the drive shaft 2, 2000. The block 28 can be labyrinth-like.

The above-described drive shaft 2, 2000 can be manufactured with the aid of an additive manufacturing method or a 3D printing method. In this case, the manufacture of a shaft of this kind 2, 2000 is based on knowledge of the distribution of the heat sources 3, 4 and preferably the heat sink(s) 5, 6 along the drive shaft 2, 2000. Each heat source 3, 4 has its docking points or stations on the drive shaft 2, 2000, which are distributed axially and/or radially and/or in the circumferential direction. These docking stations can, for example, define or specify the positions of the (first) ends 200, 201 of the heat conduction paths 20, 21. This knowledge can be used as the basis for designing a 3D model on a computer of the drive shaft 2, 2000 to be manufactured. This model is used as input for an additive manufacturing method or a 3D printing method, with which the drive shaft 2, 2000 with the at least two different heat conduction paths 20, 21, 2001, 2002, 2003, 2004, 2005 that are thermally separate from one another is manufactured from different layers/materials.

The aforementioned block 28 can, for example, also be formed by means of the additive manufacturing method.

Figure 5:
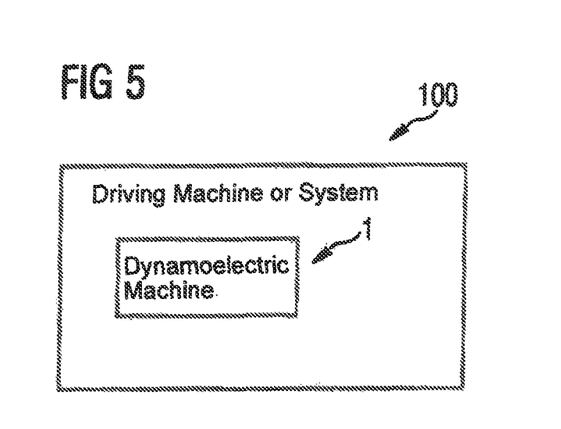
FIG. 5 shows a driving machine or system with a dynamoelectric machine.

FIG. 5 shows by way of example a driving machine or system 100 with the aforementioned dynamoelectric machine 1.

Figure 6:
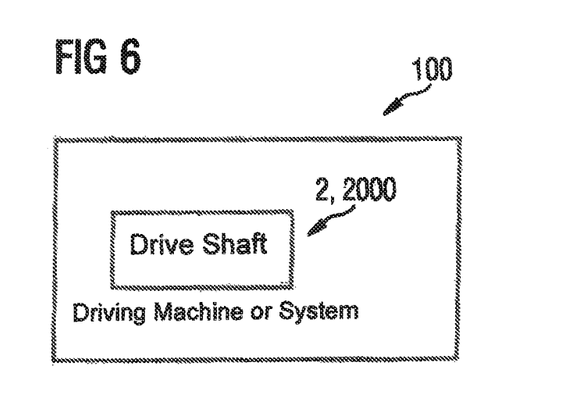
FIG. 6 shows a driving machine or system with a drive shaft.

FIG. 6 shows by way of example a driving machine or system 100 with one of the aforementioned drive shafts 2, 2000.

It is noted at this point that FIGS. 1 to 4 can be screenshots from a computer program according to the invention or from digital twins according to the invention. Hence, FIGS. 1 to 4 also show a digitized image of the drive shaft 2, 2000 and all other features of the drive shaft 2, 2000 as described above.

Said computer program and/or the corresponding digital twin can, for example, be used to simulate the heat flow within the drive shaft 2, 2000 and/or within the dynamoelectric machine 1 or the driving machine comprising this dynamoelectric machine 1 without having to carry out actual tests.

It is apparent that modifications or additions of parts can be made to the above-described drive shaft, to the manufacturing method thereof or to the dynamoelectric machine without departing from the field and scope of the present invention. It is also apparent that, although the invention has been described with reference to a few specific examples, the person skilled in the art should certainly be able to obtain many other corresponding types of drive shaft, the manufacturing method thereof or a dynamoelectric machine having all the properties set forth in the claims and which thus are all covered by the scope of protection established thereby.

The reference characters in the claims are only intended for better understanding of the present invention and in no way imply a limitation of the present invention.

What is claimed is:

1. A drive shaft of a dynamoelectric machine, said drive shaft comprising:
    at least two different heat conduction paths, each of the at least two heat conduction paths having two physically separate first and second ends;
    at least one thermal insulating layer arranged between the at least two different heat conduction paths so that the at least two different heat conduction paths are thermally separate from one another;
    a plurality of different heat sources thermally coupled to the first ends; and
    at least one heat sink thermally coupled to the second ends.

2. The drive shaft of claim 1, wherein the at least two different heat conduction paths are thermally coupled at the first ends to different ones of said plurality of different heat sources that have different temperatures that are higher than a temperature of the at least one heat sink.

3. The drive shaft of claim 2, further comprising a receptacle configured to receive the at least one heat sink.

4. The drive shaft of claim 3, wherein the receptacle is arranged coaxially with the drive shaft.

5. The drive shaft of claim 1, wherein the at least two different heat conduction paths are made of different materials.

6. The drive shaft of claim 1, wherein at least one of the at least two different heat conduction paths forms a monolithic structure.

7. The drive shaft of claim 1, wherein the at least two different heat conduction paths are electrically separate from one another.

8. The drive shaft of claim 1, wherein the at least two different heat conduction paths and the at least one thermal Insulating layer are arranged in a coaxial relationship.

9. The drive shaft of claim 1, wherein each of the at least two different heat conduction paths has, in cross section, approximately a shape of a segment of a circle, a segment of a ring, or a segment of an annulus.

10. The drive shaft of claim 1, further comprising a thermal block configured to prevent a heat flow in an axial direction between a first part of the drive shaft and a second part of the drive shaft.

11. The drive shaft of claim 1, wherein each of the at least two different heat conduction paths is embodied as monolithic.

12. The drive shaft of claim 1, wherein the at least one thermal insulating layer comprises a material or being made of said material, with the material having a thermal conductivity that is worse than a thermal conductivity of the at least two different heat conduction paths.

13. The drive shaft of claim 1, wherein at least one of the at least two different heat conduction paths is thermally separate from an outer peripheral surface of the drive shaft.

14. The drive shaft of claim 13, further comprising a thermally insulating layer configured to thermally separate the at least one of the at least two different heat conduction paths from the outer peripheral surface of the drive shaft.

15. A method for manufacturing a drive shaft for a dynamoelectric machine, said method comprising:
    manufacturing the drive shaft according to claim 1 by a process selected from the group consisting of additive-manufacturing method and 3D printing.

16. The drive shaft of claim 1, wherein at least two of the plurality of different heat sources are thermally coupled to the first end of one of the at least two different heat conduction paths.

17. The drive shaft of claim 1, wherein the at least two different heat conduction paths form segments of a ring defined by intermediate spaces between the at least one thermal insulating layer.

18. A dynamoelectric machine comprising:
- a drive shaft, said drive shaft comprising at least two different heat conduction paths, each of the at least two heat conduction paths having two physically separate first and second ends;
- at least one thermal insulating layer arranged between the at least two different heat conduction paths so that the at least two different heat conduction paths are thermally separate from one another;
- a rotor thermally coupled to the first end of one of the at least two different heat conduction paths;
- a bearing thermally coupled to the first end of a different one of the at least two different heat conduction paths; and
- at least one heat sink coupled to the second ends.

19. The dynamoelectric machine of claim 18, wherein the at least one heat sink is embodied as a fan or a heat exchanger and/or comprises a cooling medium.

20. The dynamoelectric machine of claim 18, further comprising a heat-separating apparatus arranged on the drive shaft in such a way that, after decoupling from the at least two different heat conduction paths, heat continues to flow away from the dynamoelectric machine along paths that are thermally insulated from one another.

21. The dynamoelectric machine of claim 18, wherein the at least two different heat conduction paths form segments of a ring defined by Intermediate spaces between the at least one thermal insulating layer.

* * * * *